United States Patent [19]

Stayner et al.

[11] 4,106,958
[45] Aug. 15, 1978

[54] CHLORINATED WAX FLUX COMPOSITIONS

[75] Inventors: Robert A. Stayner, Lafayette; Richard C. Fox, San Rafael; Thornton K. Jones, Greenbrae, all of Calif.

[73] Assignee: Chevron Research Company, San Francisco, Calif.

[21] Appl. No.: 811,503

[22] Filed: Jun. 30, 1977

[51] Int. Cl.$^2$ ............................................. B23K 35/34
[52] U.S. Cl. ........................................................ 148/23
[58] Field of Search ...................................... 148/22–25

[56] References Cited

U.S. PATENT DOCUMENTS

| | | | |
|---|---|---|---|
| 2,626,881 | 1/1953 | Schoenfeld | 148/23 |
| 2,715,084 | 8/1955 | Konig | 148/23 |
| 2,992,949 | 7/1961 | Melchiors | 148/23 |
| 3,000,769 | 9/1961 | Melchiors | 148/23 |

*Primary Examiner*—P. D. Rosenberg
*Attorney, Agent, or Firm*—D. A. Newell; C. J. Tonkin; J. J. DeYoung

[57] ABSTRACT

Disclosed is a wax-flux composition and a process for making a wax-flux composition comprising a normally solid chlorinated wax having a chlorine content below about 60 weight percent.

5 Claims, No Drawings

CHLORINATED WAX FLUX COMPOSITIONS

BACKGROUND OF THE INVENTION

This invention relates to soldering and fluxes used in soldering processes. More particularly, this invention relates to soldering fluxes useful in high-temperature soldering processes.

Soldering is one of the oldest methods of joining two or more metal articles. Soldering involves the joining of metallic surfaces by flowing between them by capillary attraction alloys of lower melting point than the metals to be joined. The metal surfaces remain unmelted, but are solidly united when the solder alloy or solder metal solidifies.

Preparation of the joint surfaces is an important factor in soldering. With few exceptions, a flux composition is utilized. Fluxes are used to prevent the oxidation of the filler metal and of the surfaces of the metal being joined during the heating. The flux will also dissolve oxides which naturally exist on most surfaces as well as those that may form during the heating operation. Additionally, fluxes influence the surface-tension equilibrium in the direction of solder spreading.

Fluxes are applied to the metal surfaces to be soldered by many methods, for example brushing, spraying, dipping, etc. However, utilization of a liquid vehicle for application of the flux has many disadvantages in many processes. For example, in the assembly of automotive radiators, the parts to be soldered are commonly dipped in a flux-containing bath. Dipping of the part has many disadvantages. First, it results in a large waste of material, since the entire part is coated with fluxing material rather than just the surface to be soldered; secondly, the solvent must be evaporated first before the soldering occurs, and this results in a loss of energy; thirdly, use of a solvent-or water-based flux creates air pollution problems due to emissions of volatile constituents into the atmosphere.

The aforementioned problems can be overcome through utilization of a wax flux. Wax-flux compositions are known in the art and have been used in low-temperature soldering processes. See, for example, U.S. Pat. Nos. 3,977,916; 3,960,614; 3,960,613; 3,975,216; and 3,954,494, which discloses wax-flux compositions containing sulfonic acids. Wax-flux compositions avoid some of the prior art problems encountered with liquid fluxes in that the flux can be readily applied only to the surface to be soldered, thus avoiding waste of flux. Furthermore, the wax quickly solidifies so that the parts can be easily stored for future soldering. However, wax-flux compositions have not been utilized in higher-temperature soldering for many reasons, but particularly because of the auto-ignition hazards caused by the wax component of the flux.

The use of inorganic gases and liquid organic halogen-containing fluxes is known in the art. See, for example, pages 19-20 of Manko, *Solders and Soldering*, McGraw-Hill (1964). One problem with the organic halogen-containing fluxes is that of corrosion. The organic halogen-containing fluxes are extremely temperature-sensitive by virtue of the organic radical and the halogen and acids formed therefrom are extremely corrosive. Also, because of their hazardous nature, special equipment is required for safety reasons. Furthermore, any residual flux or flux residues must be removed from the part soldered to prevent future corrosion.

SUMMARY OF THE INVENTION

Disclosed is a normally solid chlorinated wax-flux having a chlorine content below 50 weight percent comprising a mixture of (a) a wax having a melting point between 40° and 100° C; and (b) a normally solid chlorinated wax having a chlorine content greater than 60%. The wax flux composition of the present invention increases the autoignition temperature of the wax, allowing use of the wax flux in higher-temperature soldering processes. The low chlorine content of the wax fluxes of the present invention are more stable, which reduces corrosion and special handling costs normally associated with liquid organic halogen-containing fluxes.

DETAILED DESCRIPTION OF THE INVENTION

Wax-flux compositions for use in soldering processes, particularly high-temperature soldering processes, are provided comprising: a normally solid chlorinated wax flux having a chlorine content below 50 weight percent comprising a mixture of (a) a wax having a melting point between 40° and 100° C; and (b) a normally solid chlorinated wax having a chlorine content greater than 60%.

Chlorinated waxes are old and well known in the art. However, depending upon the degree of chlorination, the wax can be either a solid or liquid at room temperature (25° C). Generally, chlorinated waxes with a chlorine content below 60 weight percent are liquid at room temperature, while chlorinated waxes with greater than about 60 weight percent chlorine are solids at room temperature. The normally solid, high-chlorine-content waxes are not entirely suitable in the pure state for use as wax fluxes because at the elevated temperature utilized in soldering the wax dehydrochlorinates too rapidly, leading to severe corrosion and handling problems. Surprisingly, it has been found that one can form a low-chlorine-content wax which solidifies at room temperature by blending a portion of the normally solid, high-chlorine-content wax with a second, essentially chlorine-free wax (less than 0.1 weight percent) to form a low-chlorine-content wax which is solid at room temperature. The low-chlorine-content wax flux has the advantage of being solid at room temperature and the low chlorine content does not present the corrosion and special handling problems of the pure, high-chlorine-content waxes in the soldering process.

The Wax

Suitable waxes for blending with the chlorinated wax include any wax or wax blend which is solid at room temperature an has a melting point below the temperature at which the soldering process will be conducted. Preferably the waxes have a melting point of at least 40° C and generally the waxes will have a melting point not greater than 100° C. Preferably the waxes have a melting point between 50° and 80° C. Melting points as used herein are determined by ASTM D87-66.

Suitable waxes include petroleum-derived waxes such as the well-known paraffin waxes, microcrystalline waxes, slack waxes, scale waxes, petrolatum, etc. These waxes are obtained from the processing of crude petroleum and are generally substantially saturated, substantially straight long-chain aliphatic hydrocarbons. Petroleum waxes suitable for use in this invention have melting points within the range specified above. Suitable wax blends for use in this invention include the hot-melt coatings which consist of blends of petroleum waxes and polymers, copolymers or resins. Suitable materials which may be blended with the petroleum waxes include polymers of low-molecular-weight olefins, such as polymers of ethylene, propylene, butylene, isobutylene, and the like. Suitable polymers will have molecular weights from about 1000 to about 1,000,000, more usually from about 1000 to about 50,000. These are average molecular weights, and generally a major portion of the molecules of the polymer will have molecular weights close to the average.

Suitable copolymers include copolymers of olefins. Suitable copolymers include copolymers of propene and butene. Typically such a copolymer will contain from about 15 to about 85 mol percent propene, more usually from about 25 to 75 mol percent propene. Typical copolymer molecular weights will range from about 1000 to about 1,000,000, more usually from about 1000 to about 300,000.

Suitable waxes for this invention also include waxes obtained from natural sources, such as animal, vegetable or insect sources. Suitable waxes include beeswax, carnuba wax, montan wax, wool wax, and the like.

Another type of wax suitable for use in this invention includes the well-known Fischer-Tropsch waxes. Fischer-Tropsch waxes are waxes synthesized by the familiar Fischer-Tropsch process. By this process, coal is burned in the presence of oxygen and steam to produce hydrogen and carbon monoxide, which are then reacted in the presence of catalyst to make the desired hydrocarbon wax. Suitable Fischer-Tropsch waxes for this invention can be obtained under the trade name PARAFLINT. These particular Fischer-Tropsch waxes have a high molecular weight, on the average in the range of about 750 to 1000, and generally consist essentially of straight-chain hydrocarbons.

A further type of wax suitable for this invention comprises the solid polyethers having a molecular weight in excess of about 1000. Suitable polyethers include polyethylene glycol, polypropylene glycol, polybutylene glycol and the like. Furthermore, one or both of the terminal hydroxy groups may be replaced by an alkoxy group (capped) such as methoxy, ethoxy, and the like. Polyether copolymers are also contemplated, for example a copolymer of ethylene glycol and propylene glycol. These copolymers may have a random or block structure, or mixtures thereof. The higher-molecular-weight polyethers are preferred, especially those of 4000 or more molecular weight. Such compounds are commercially available.

Although the above waxes have been mentioned individually, suitable waxes for this invention include mixtures of various proportions of the above-mentioned waxes.

The Chlorinated Wax

The normally solid chlorinated wax may be obtained from any of numerous commercial sources. The clorinated wax may be formed by bubbling chlorine through liquefied wax at an elevated temperature. Any of the above-described waxes can be utilized in making the chlorinated wax. The chlorine content of the wax can be as low as 60 weight percent, provided the chlorinated wax is solid at room temperature (25° C). Generally the chlorinated wax will have a chlorine content greater than 60 weight percent, and preferably from 65 to 75 weight percent.

The Chlorinated Wax-Flux Composition

The chlorinated wax-flux compositions of this invention are prepared by melting and blending together the high-chlorine-content wax and a second, non-chlorinated wax. The mixture is stirred until homogeneity is obtained, and the composition is allowed to solidify. Surprisingly, when the mixture cools, it solidifies rather than remaining as a liquid, as one would expect with chlorinated waxes having a chlorine content in the range 25 to 50 weight percent.

The wax flux compositions of this invention will dehydrochlorinate thermally to cause fluxing at or below the soldering temperature of the piece to be soldered. The rate at which dehydrochlorination occurs can readily be determined by those skilled in the art by a few simple soldering tests to determine the minimum amount necessary. Excessive dehydrochlorination above that necessary to cause effective fluxing is generally undesirable, because it can cause corrosion of the soldered surfaces. In addition, the cost of the wax-flux composition is increased without additional benefits during the soldering process.

The chlorinated wax-flux compositions of the present invention will generally have a chlorine content below 50 weight percent, and generally in the range of 5 to 30 weight percent, and preferably 10 to 20 weight percent. The desired chlorine level is simply obtained by blending the appropriate quantity of high-chlorine-content wax with the non-chlorinated wax.

The fluxing compositions of the present invention can be utilized in any soldering process requiring a flux. The fluxing compositions of the present invention are particularly useful in high-temperature soldering processes wherein prior art wax fluxes would normally present a fire hazard. Such high-temperature soldering processes typically require soldering temperatures of 245° to 375° C, usually 300° to 375° C.

EXAMPLES

The suitability of the wax-flux compositions of the present invention is illustrated by the following examples. The solderability tests were done using a General Electric meniscograph, which provides a continuous record of the wetting process by measuring the push-and-pull on a specimen as it is partially immersed in molten solder. When a test specimen first enters a solder bath, before wetting occurs, the specimen floats on the solder and resists being pushed into the bath. After wetting occurs, the solder climbs the surface of the specimen, pulling the specimen toward the solder. The push-and-pull on the specimen is measured by a transducer, which produces a direct-current signal that is recorded. The total time of the test is limited to 8 seconds. With the output initially set at zero, the time required to return to zero after being partially immersed is defined as the "wetting time". Generally, the shorter the wetting time, the hotter the flux composition. Wetting times of about 2.5 seconds show some fluxing effectiveness, but very good fluxing agents give wetting times of less than 1.5 seconds.

Table I shows the wetting times of representative chlorine-containing organic compounds of this invention, as measured by the meniscograph.

TABLE I

| Ex. No. | Chlorine-containing compound, wt.% | Wax[3] Melting point, °C | Time to wet (sec.) |
|---|---|---|---|
| 1 | 5% Chlorowax-70[1] + 5% Armeen-2C[2] | 68–69 | 1.25 |
| 2 | 5% Chlorowax-70[1] + 5% stearic acid | 68–69 | 1.25 |
| 3 | 10% Chlorowax-70[1] + 5% dodecylbenzene sulfonic acid | 68–69 | 1.0 |
| 4 | 24% Chlorowax-70[1] + 6% antimony oxide 10% dodecylbenzenesufonic acid | 53.5–54.5 | 0.8 |
| 5 | 40% Chlorowax-70[1] + 10% antimony oxide 10% dodecylbenzene sulfonic acid | 53.5–54.5 | 1.0 |

[1] A chlorinated petroleum wax having 70 weight percent chlorine
[2] A secondary amine from coconut oil
[3] A refined petroleum wax The following compositions having over 50% total chlorine were also tested by the same procedure:

| Composition | Time to wet (sec) |
|---|---|
| 100% Chlorowax-70 | Did not wet |
| 90% Chlorowax-70, 10% stearic acid | 5 |
| 80% Chlorowax-70, 20% stearic acid | Did not wet |

What is claimed is:

1. A chlorinated wax-flux composition having a chlorine content below 50 weight percent and which is solid at 25° C comprising a mixture of (a) a wax having a melting point between 40° and 100° C; and (b) a solid chlorinated wax having a chlorine content greater than 60 weight percent.

2. A wax-flux composition of claim 1 having a chlorine content from 5 to 30 weight percent.

3. A wax-flux composition of claim 2 having a chlorine content from 10 to 20 weight percent.

4. A wax-flux composition of claim 3 having a melting point from 50° to 80° C.

5. A process for producing a normally solid chlorinated wax composition having a chlorine content below 50 weight percent which comprises blending a first chlorine-free wax composition having a melting point in the range 40° to 100° C with a second wax composition comprising a normally solid chlorinated wax having a chlorine content greater than 60 weight percent.